(12) United States Patent
Bae et al.

(10) Patent No.: US 10,747,489 B2
(45) Date of Patent: *Aug. 18, 2020

(54) METHOD FOR DISPLAYING CONTENT AND ELECTRONIC DEVICE THEREFOR

(71) Applicant: Samsung Electronics Co., Ltd., Suwon-si, Gyeonggi-do (KR)

(72) Inventors: Jong-Kon Bae, Seoul (KR); Dong-Kyoon Han, Seongnam-si (KR); Dong-Hui Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,639

(22) Filed: Jul. 18, 2019

(65) Prior Publication Data

US 2019/0339920 A1    Nov. 7, 2019

Related U.S. Application Data

(63) Continuation of application No. 14/942,383, filed on Nov. 16, 2015, now Pat. No. 10,394,510.

(30) Foreign Application Priority Data

Nov. 17, 2014    (KR) .......................... 10-2014-0160350

(51) Int. Cl.
*G06F 3/14* (2006.01)
*G09G 5/393* (2006.01)
*G09G 5/395* (2006.01)
*G09G 5/00* (2006.01)

(52) U.S. Cl.
CPC ............... *G06F 3/14* (2013.01); *G09G 5/393* (2013.01); *G09G 5/395* (2013.01); *G06F 3/1454* (2013.01); *G09G 5/006* (2013.01); *G09G 2340/02* (2013.01)

(58) Field of Classification Search
None
See application file for complete search history.

(56) References Cited

U.S. PATENT DOCUMENTS

| | | | |
|---|---|---|---|
| 5,819,215 A | 10/1998 | Dobson et al. | |
| 6,661,811 B1 | 12/2003 | Baker | |
| 2006/0202618 A1 | 9/2006 | Ishii et al. | |
| 2009/0041380 A1* | 2/2009 | Watanabe | G06F 21/84 382/276 |
| 2013/0222271 A1 | 8/2013 | Alberth et al. | |
| 2014/0168234 A1* | 6/2014 | Tripathi | G09G 5/00 345/520 |
| 2015/0302832 A1* | 10/2015 | Xie | G09G 5/363 345/520 |

* cited by examiner

*Primary Examiner* — Benjamin C Lee
*Assistant Examiner* — Krishna P Neupane
(74) *Attorney, Agent, or Firm* — Jefferson IP Law, LLP

(57) ABSTRACT

A method for displaying content by an electronic device is provided. The method includes generating converted data by encoding a plurality of screen data according to first clocks, restoring the screen data by decoding the converted data based on second clocks separate from the first clocks, and displaying the restored screen data.

7 Claims, 12 Drawing Sheets

METHOD FOR DISPLAYING CONTENT AND ELECTRONIC DEVICE THEREFOR

CROSS-REFERENCE TO RELATED APPLICATION(S)

This application is a continuation application of prior application Ser. No. 14/942,383, filed on Nov. 16, 2016, which was based on and claimed priority under 35 U.S.C. § 119(a) of a Korean patent application filed on Nov. 17, 2014 in the Korean Intellectual Property Office and assigned Serial No. 10-2014-0160350, the entire disclosure of which is hereby incorporated by reference.

TECHNICAL FIELD

The present disclosure relates to methods for displaying content on a display by an electronic device.

BACKGROUND

With the recent development of technologies for information, communication, semiconductors, etc., popularization and more wide spread use of various portable terminals are growing rapidly. Especially, modern portable terminals are not confined to their traditional exclusive domains of portable communication but have reached a mobile convergence stage where they even embrace domains of other terminals. For example, in addition to common communication functionality, such as calling or text messaging, mobile communication terminals have other various functionality, such as Television Watching functionality (e.g., mobile broadcasting receiver functionality, e.g., Digital Multimedia Broadcasting (DMB) or Digital Video Broadcasting (DVB) receiver functionality), music play functionality (e.g., MPEG Audio Layer-3 (MP3) player functionality), photography functionality, Internet access functionality, etc.

In recent years, as a kind of portable terminal, wearable devices have emerged in the form of wrist watches, headsets, glasses, etc. that may be worn by the user. The wearable device may be a stand-alone device, or may operate as a companion device that cooperates with another portable terminal (or a host device) to provide the user with at least a part of functionality (e.g., calling, messaging, streaming functionality, etc.) of the portable terminal Among them, the watch-type wearable devices are now providing the user with watch functionality by displaying current time on the display.

The above information is presented as background information only to assist with an understanding of the present disclosure. No determination has been made, and no assertion is made, as to whether any of the above might be applicable as prior art with regard to the present disclosure.

SUMMARY

Wearable devices of the related art only display a current time through their display when they are in wakeup mode. While in sleep mode, they do not provide watch functionality because their display is powered off and unable to display time.

Aspects of the present disclosure are to address at least the above-mentioned problems and/or disadvantages and to provide at least the advantages described below. Accordingly, an aspect of the present disclosure is to provide a method and electronic device, which may display content for the user without regard to an operation mode of the electronic device.

In accordance with an aspect of the present disclosure, a method for displaying content by an electronic device is provided. The method includes generating converted data by encoding a plurality of screen data according to first clocks, restoring the screen data by decoding the converted data based on second clocks separate from the first clocks, and displaying the restored screen data.

In accordance with another aspect of the present disclosure, an electronic device for displaying content is provided. The electronic device includes a display configured to display a plurality of screen data, and a first processor configured to generate the plurality of screen data or receive the plurality of screen data from another device, and forward the plurality of screen data to a display processor, wherein the display processor is configured to control the display to display at least one of the plurality of screen data periodically or in response to an event that occurs in the electronic device, based on second clocks separate from first clocks for the first processor.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
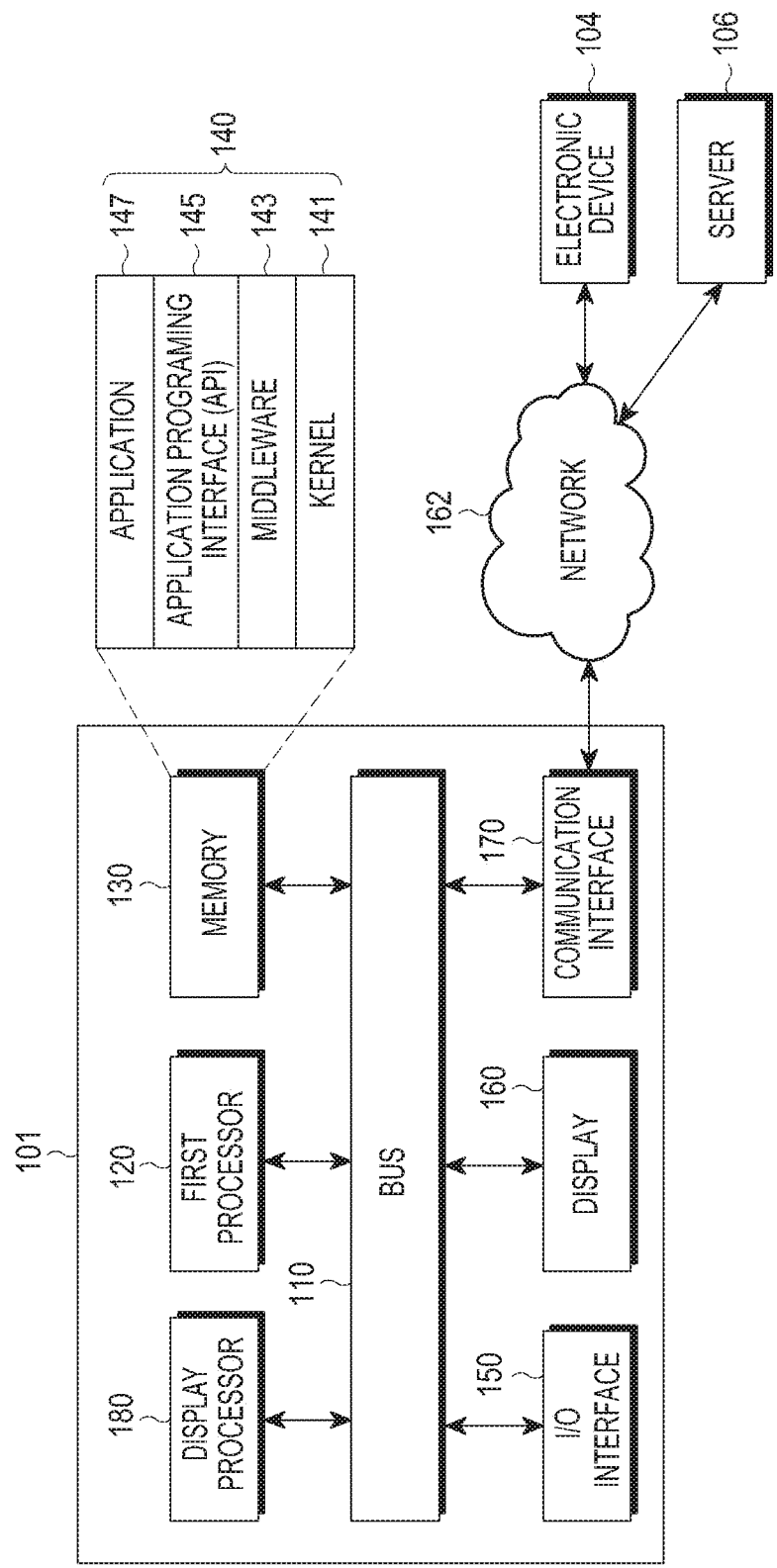
FIG. 1 shows a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprise" and/or "comprising" as used herein specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For examples, "A or B" may include A, or include B, or include both A and B.

Ordinal numbers as used herein, such as "first", "second", etc., may modify various components in various embodiments, but the modification may not be limited to those components. For example, these terms do not limit the order and/or importance of corresponding elements, components, regions, layers and/or sections. These terms are only used to distinguish one element, component, region, layer or section from another. For example, a first user device and a second user device refer to two different user devices. A first element, component, region, layer or section could be termed a second element, component, region, layer or section without departing from the teaching of various embodiments of the present disclosure.

When the term "connected" or "coupled" is used, it is to be understood that a component may be directly connected or coupled to another component or may be indirectly connected or coupled to another component via another new component. However, if a component is said to be "directly connected" or "directly coupled" to another component, it should be interpreted as lacking any intervening components.

The terminology used herein is for the purpose of describing particular embodiments only and is not intended to limit the various embodiments of the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may have communication functionality or image processing functionality. For example, the electronic device may include at least one of smart phones, tablet Personal Computers (PCs), mobile phones, video phones, e-book readers, desktop PCs, laptop PCs, netbook computers, Personal Digital Assistants (PDAs), Portable Multimedia Players (PMPs), MPEG Audio Layer-3 (MP3) players, mobile medical devices, cameras, and wearable devices (e.g., Head-Mounted Devices (HMDs), such as electronic glasses, electronic clothes, electronic bracelets, electronic necklaces, electronic appcessories, electronic tattoos, or smart watches).

In various embodiments, the electronic device may be a smart home appliance having communication functionality or image processing functionality. The smart home appliance may include at least one of e.g., televisions, Digital Video Disc (DVD) players, audio systems, refrigerators, air conditioners, cleaning machines, ovens, microwaves, washing machines, air purifiers, set-top boxes, TV sets (e.g., Samsung HomeSync™, Apple TV™, or Google TV™), game consoles, electronic dictionaries, electronic keys, camcorders, and electronic albums.

In various embodiments, the electronic device may include at least one of a variety of medical equipment (e.g., Magnetic Resonance Angiography (MRA), Magnetic Resonance Imaging (MRI), Computed Tomography (CT), photographing device, ultrasonic device, etc.), navigation devices, Global Positioning System (GPS) receivers, Event Data Recorders (EDRs), Flight Data Recorders (FDRs), car infotainment devices, marine electronic devices (e.g., marine navigation systems, gyro-compass, etc.), avionics, security devices, car head units, industrial or home robots, banking agency's Automatic Teller Machines (ATMs), or Point of Sales (POSs) for shops.

In various embodiments, the electronic device may include at least one of a part of furniture or building/structure, electronic boards, electronic signature receiving devices, projectors, or various instrumental equipment (e.g., meters for water, electricity, gas, or radio waves), which may include communication functionality or image processing functionality. The electronic device in accordance with various embodiments of the present disclosure may be one or more combinations of the aforementioned devices. In addition, the electronic device in accordance with various embodiments of the present disclosure may be a flexible device. It will be obvious to a person of ordinary skill in the art that the electronic device is not limited to the aforementioned examples.

An electronic device in accordance with various embodiments of the present disclosure will now be described with reference to accompanying drawings. The term "user" as herein used may refer to a person who uses the electronic device or a device (e.g., an artificially intelligent device) that uses the electronic device.

FIG. 1 illustrates a network environment including an electronic device, according to an embodiment of the present disclosure.

Referring to FIG. 1, the electronic device 101 may include a bus 110, a first processor 120, a memory 130, an input/output (I/O) interface 150, a display 160, a communication interface, and a display processor 180.

The bus 110 may include circuitry for interconnecting the enumerated or other components and delivering communications (e.g., control messages) among them.

The first processor 120 may, for example, receive requests or commands from the enumerated or other components, e.g., the memory 130, the I/O interface 150, the display 160, the communication interface 170, or the display processor 180 via the bus 110, interpret the requests or commands, and perform calculation or data processing according to the interpreted request or command.

In accordance with an embodiment, the first processor 120 may generate a plurality of screen data to be displayed on the display 160. Alternatively, the first processor 120 may control the communication interface 170 to receive a plurality of screen data from other devices, e.g., an electronic device 104 or a server 106. After generating the plurality of screen data or receiving them from other devices, the first processor 120 may forward the plurality of screen data to the display processor 180. The screen data generated by the first processor 120 or received from other devices may be e.g., screens that display a current time (hereinafter, called 'clock screens').

In other words, the first processor 120 may generate the clock screens as the screen data. The first processor 120 may generate clock screens at every designated time. For example, the first processor 120 may generate the clock screens to be displayed on the display 160, for example, every hour on 5, 15, 25, 35, 45, and 55 minutes for 10 minutes. The first processor 120 may generate the clock screens to be displayed on the display 160, for example, every hour on 55 minutes for 1 hour.

In an embodiment, the clock screens, i.e., the screen data generated by the first processor 120 may be image files with extensions "jpg", "jpeg", "gif", "bmp", "tiff", "png", etc. In another embodiment, the clock screens, i.e., the screen data generated by the first processor 120 may be image files with extensions "avi", "mov", "mpeg", "mp4", "mkv", etc.

In an embodiment, the first processor 120 may encode the screen data, e.g., clock screens. The first processor 120 may perform e.g., run-length encoding on the screen data, to generate converted data encoded from the screen data.

In an embodiment, the first processor 120 may forward the converted data to the display processor 180 or store them in the memory 130. The memory 130 may store requests, commands, or data generated or received from the enumerated or other components, e.g., the first processor 120, the I/O interface 150, the display 160, the communication interface 170, or the display processor 180. The memory 130 may store software and/or a program 140. The program 140 may include, for example, programming modules, such as a kernel 141, middleware 143, an Application Programming Interface (API) 145, an application 147, or the like. Each of the programming modules may be implemented in software, firmware, hardware, or two or more combinations thereof.

The kernel 141 may control or manage system resources (e.g., the bus 110, the first processor 120, the memory 130 or the like) to be used to carry out an operation or function implemented by the other programming modules, e.g., the middleware 143, the API 145, or the application 147. Furthermore, the kernel 141 may provide an interface for the middleware 143, the API 145, or the application 147 to access respective components of the electronic device 101 to control or manage them.

The middleware 143 may act as intermediary for the API 145 or the application 147 to communicate data with the kernel 141. In addition, the middleware 143 may perform control operations (e.g., scheduling or load balancing) in response to a task request received from the application 147 by way of e.g., placing a high priority on at least one application included in the application 147 to use system resources (e.g., the bus 110, the first processor 120, the memory or the like) of the electronic device 101.

The API 145 is an interface for the application 147 to control a function provided from the kernel 141 or the middleware 143, and may include at least one interface or function (e.g., an instruction) for e.g., file control, window control, image processing, text control, etc.

In accordance with various embodiments, the application 147 may include a Short Message Service (SMS)/Multimedia Message Service (MMS) application, an email application, a calendar application, an alarm application, a healthcare application (e.g., an application for measuring quantity of motion or blood sugar), or environmental information application (e.g., an application for providing atmospheric pressure, humidity, or temperature). Additionally or alternatively, the application 147 may be an application involved in information exchange between the electronic device 101 and an external electronic device 104. The application involved in such information exchange may include e.g., a notification relay application for relaying particular information to the external electronic device 104 or a device management application for managing the external electronic device 104.

For example, the notification relay application may include a functionality for notifying the external electronic device 104 of notification information generated in any other application (e.g., the SMS/MMS application, the email application, the healthcare application, or the environmental information application) of the electronic device 101. Additionally or alternatively, the notification relay application may, for example, receive the notification information from the external electronic device 104 and provide the notification information to the user. The device manager application may manage (e.g., install, delete or update) a function (e.g., turning on/off the external electronic device 104 itself or a part of the external electronic device 104, or controlling display brightness of the external electronic device 104) with respect to part of the external electronic device 104 in communication with the electronic device 101, or a service (e.g., calling or messaging service) provided by the external electronic device 104 or an application running in the external electronic device 104.

In accordance with various embodiments of the present disclosure, the application 147 may include an application designated depending on an attribute of the electronic device 104, e.g., on a type of the electronic device 104. For example, in case the external electronic device 104 is an MP3 player, the application 147 may include an application related to music replay. Similarly, in case the external electronic device 104 is a mobile medical device, the application 147 may include an application related to healthcare. In accordance with an embodiment, the application 147 may include at least one of an application dedicated to the electronic device 101, and an application received from the external electronic device 104 or the server 106.

The I/O interface 150 may deliver instructions or data entered by the user through the I/O device (e.g., a sensor, a keyboard, or a touch screen) to the first processor 120, the memory 130, the communication interface 170, or the display processor 180 via the bus 110. For example, the I/O interface 150 may provide data for a user touch input through the touch screen to the first processor 120. The I/O interface 150 may also output a command or data received from the first processor 120, the memory 130, the communication interface 170, or the display processor 180 via the bus 110 through the I/O device (e.g., a speaker or the display 150). For example, the I/O interface 150 may output sound data processed by the first processor 120 to the user.

The display 160 may display a variety of information (e.g., multimedia data or text data) for the user. The display 160 may display the screen data, e.g., clock screens under control of the display processor 180.

The communication interface 170 may connect communication between the electronic device 101 and the external electronic device 104 or the server 106. For example, the communication interface 170 may be connected to a network 162 through wired or wireless communication and may communicate with the external electronic device 104 or the server 106. The wireless communication may include at least one of Wireless Fidelity (Wi-Fi), Bluetooth (BT), Near Field Communication (NFC), GPS, or cellular communication (e.g., Long Term Evolution (LTE), LTE-Advanced (LTE-A), Code Divisional Multiplexing Access (CDMA), Wide CDMA (WCDMA), Universal Mobile Telecommunications System (UMTS), Wireless Broadband (Wibro) or Global System for Mobile communication (GSM). The wired communication may include at least one of e.g., Universal Serial Bus (USB), High Definition Multimedia Interface (HDMI), Recommended Standard (RS) 232 or Plain Old Telephone Service (POTS).

In an embodiment, the communication interface 170 may receive a plurality of screen data generated by the other devices, e.g., the electronic device 104 and the server 106, under control of the first processor 120.

In accordance with an embodiment, the network 162 may be a telecommunications network. The telecommunications network may include at least one of a computer network, the Internet, the Internet of things, or a telephone network. In accordance with an embodiment, a protocol (e.g., a transport layer protocol, a data link layer protocol or a physical layer protocol) for communication between the electronic device 101 and the external device 104 or the server 106 may be supported by at least one of the application 147, the API 133, the middleware 143, the kernel 141 or the communication interface 170.

The display processor 180 may handle at least a part of information obtained from other components (e.g., the first processor 120, the memory 130, the I/O interface 150, or the communication interface 170) and provide the results to the user in various ways. For example, the display processor 180 may control at least a part of functionality of the electronic device 101 to make the electronic device 101 cooperate with another electronic device, e.g., the electronic device 104 or the server 106, by means of the first processor 120 or independently.

In accordance with various embodiments, the display processor 180 may control presentation of the content displayed on the display 160. For example, the display processor 180 may control the display 160 to display a clock screen.

In an embodiment, the display processor 180 may receive the converted data from the first processor 120 or from another electronic device, e.g., the electronic device 104 or the server 106 through the communication interface 170.

In an embodiment, the display processor 180 may restore the converted screen data to the screen data, e.g., the clock screen by decoding the converted data. The display processor 180 may restore the converted data to the screen data by performing e.g., run-length decoding on the converted data. The display processor 180 may control presentation of the restored screen data. For example, given that the screen data corresponds to clock screens, the display processor 180 may control the display 160 to display the clock screens in time sequence.

More information about the first processor 120 and the display processor 180 is provided below in connection with FIGS. 2 to 10.

Figure 2:
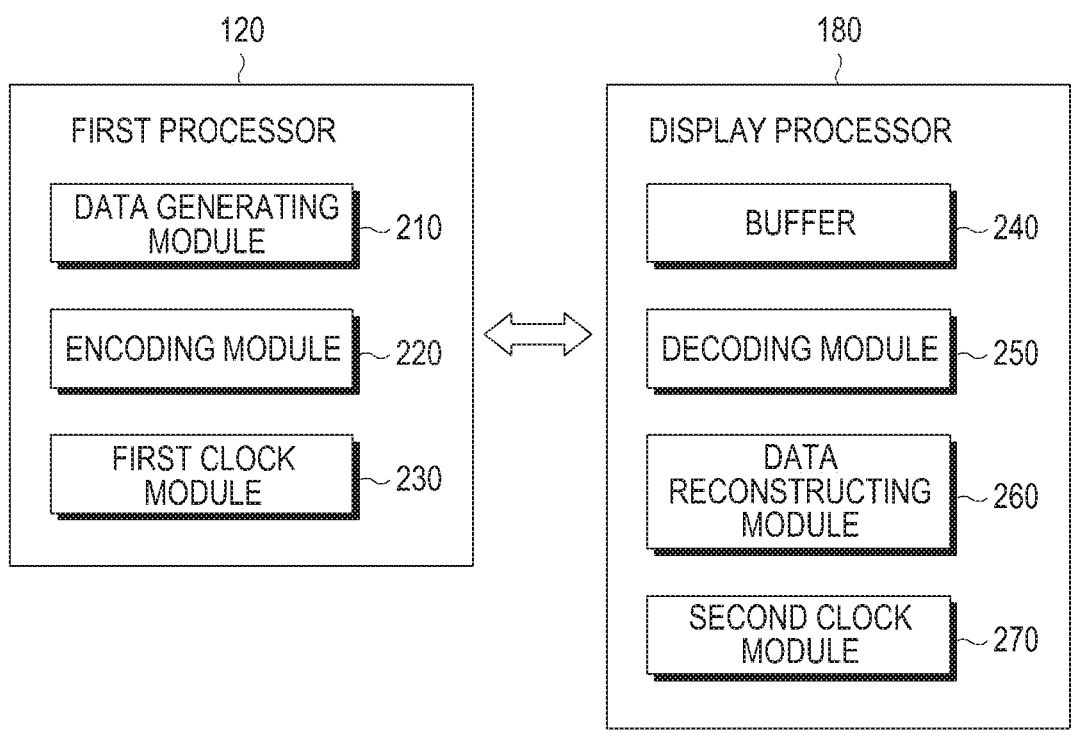
FIG. 2 is a block diagram of a first processor and a display processor in an electronic device, such as the electronic device of FIG. 1, according to various embodiments of the present disclosure.

FIG. 2 is a block diagram of a first processor and a display processor in an electronic device, such as the electronic device of FIG. 1, according to various embodiments of the present disclosure.

Referring to FIG. 2, the first processor 120 may include one or more of a data generating module 210, an encoding module 220, and a first clock module 230.

In various embodiments, the data generating module 210 may generate one or more screen data, e.g., clock screens to be displayed on the display 160. For example, if the clock screen displayed on the display 160 is to display current time in minutes, the data generating module 210 may generate minute-based clock screens as the screen data. If the clock screen is to display current time in seconds, the data generating module 210 may generate second-based clock screens as the screen data.

In an embodiment, the data generating module 210 may generate 10 clock screens sequentially displayed on the display 160 for 10 minutes. For example, the data generating module 210 may generate clock screens displayed on the display 160 between 10:00 and 10:09, e.g., clock screens for 10:00, 10:01, 10:02, 10:03, 10:04, 10:05, 10:06, 10:07, 10:08, 10:09.

In an embodiment, the data generating module 210 may generate screen data to include other content, e.g., date, weather, shortcut icons, schedules, etc. that may be displayed on the display 160.

In an embodiment, the data generating module 210 may generate a background image or number images for the clock screens. The background image may contain one or more contents that remain unchanged for a predetermined time, which may serve as the background for the clock screen. The number images may be images of numbers used to represent the current time, e.g., images of numbers representing hours, minutes, and seconds. In an embodiment, in a case in which the data generating module 210 generates the background image and number images, a data reconstructing module 260 of the display processor 180 may reconstruct the clock screen by combining the background image and the number images.

The data generating module 210 may generate clock screens displayed on the display 160 for the time between 10:00 and 10:09. The data generating module 210 may generate an image that corresponds to "10:0□" that represents time except for a minute part, including a background of the clock screen, as the background image. In an embodiment, the data generating module 210 may generate images of numbers to be inserted in the blank "□", i.e., images for respective numbers 0, 1, 2, 3, 4, 5, 6, 7, 8, 9.

The encoding module 220 may generate converted data by encoding the screen data, e.g., the clock screen. By generating the converted data, the encoding module 220 may reduce the volume of the clock screen. In an embodiment, the encoding module 220 may be implemented as a run-length encoder. The encoding module 220 may perform run-length encoding on the respective clock screens displayed on the display 160 for the time e.g., between 10:00-10:09.

The first clock module 230 may generate clocks. The first clock module 230 may wake up the electronic device 101 at predetermined intervals (e.g., 10 minutes). The first clock module 230 may enable the data generating module 210 to generate screen data, e.g., clock screens at the predetermined time intervals by waking up the first processor 120 at the intervals. Furthermore, the encoding module 220 may convert the screen data to converted data every time the first clock module 230 wakes up the first processor 120.

The display processor 180 may include one or more of a buffer 240, a decoding module 250, the data reconstructing module 260, and a second clock module 270.

The buffer 240 may store the screen data, e.g., clock screens generated by the first processor 120 or the converted data converted from the screen data, e.g., converted images.

The decoding module 250 may decode the converted data stored in the buffer 240. For example, the decoding module 250 may restore the converted images to the clock screen or to the background image or number images by decoding the converted images. The display 160 may display the clock screens restored by the decoding module 250 in time sequence.

The data reconstructing module 260 may reconstruct the screen data. For example, the data reconstructing module 260 may reconstruct the clock screens by combining the background image and one or more number images.

For example, it is assumed that the data generating module 210 generated a background image that corresponds to "10:0□" and number images to be inserted into the blank '□', for the clock screen images to be displayed on the display 160 between 10:00~10:09. The data reconstructing module 260 may reconstruct the clock screen for a particular time by inserting one of the number images into the blank "□" of the "10:0□". For example, the data reconstructing module 260 may reconstruct a clock screen for "10:04" by inserting '4' into the black "□" of the "10:0□".

The second clock module 270 is a separate clock module from the first clock module 230, and may generate clocks to be applied to the display processor 180. The display processor 180 may control the display 160 to display the screen data according to the clocks generated by the second clock module 270.

In an embodiment, the display processor 180 may control content presentation of the display 160 according to the clocks generated by the second clock module 270 without regard to the operation mode of the electronic device 101. For example, even if the electronic device 101 is in the sleep mode, the display processor 180 may control the display 160 to display the clock screens in time sequence according to the clocks generated by the second clock module 270.

An electronic device for displaying content in accordance with an embodiment of the present disclosure may include a display configured to display a plurality of screen data, a first processor configured to: generate the plurality of screen data or receive the plurality of screen data from another device, and forward the plurality of screen data to a display processor, and the display processor configured to control the display to display at least one of the plurality of screen data periodically or in response to an event that occurs in the electronic device, based on second clocks separate from first clocks for the first processor.

Figure 3A:
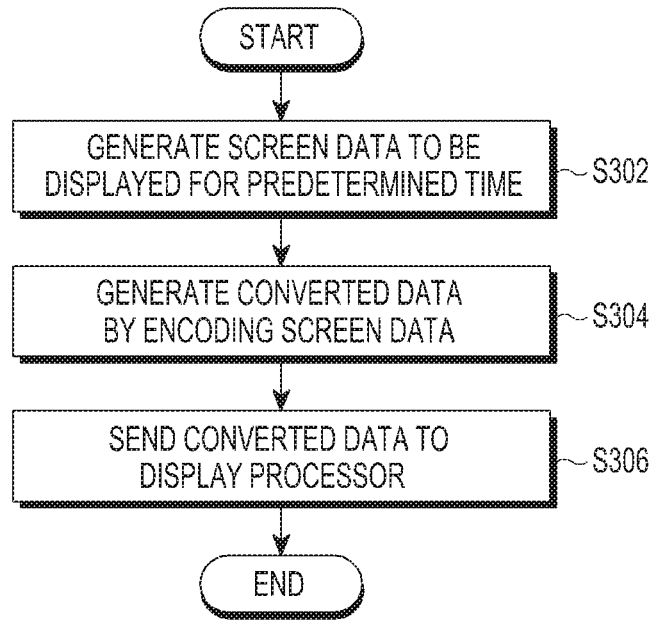
FIGS. 3A and 3B are flowcharts illustrating methods for generating screen data by an electronic device, such as the electronic device of FIG. 1, according to various embodiments of the present disclosure.

FIG. 3A is a flowchart illustrating a method for generating screen data by an electronic device, such as the electronic device of FIG. 1, according to an embodiment of the present disclosure.

Referring to FIG. 3A, the data generating module 210 of the first processor 120 may generate a plurality of screen data, e.g., clock screens to be displayed on the display 160 for a predetermined time, at operation S302. Once the screen data is generated by the data generating module 210, the encoding module 220 of the first processor 120 may generate converted data by encoding the screen data, at operation S304.

The converted data may have less volume than the screen data, e.g., the clock screens do. For example, assuming that the resolution of the display 160 is 320×320=102,400 pixels, the encoding module 220 may reduce the resolution of the clock screen into 10,240 pixels by compressing the 320×320 pixels of the clock screen. With the encoding of the respective clock screens, the encoding module 220 may reduce the volume of the respective clock screens. Once the converted data is generated, the first processor 120 may forward the converted data to the display processor 180, in operation S306.

Figure 3B:
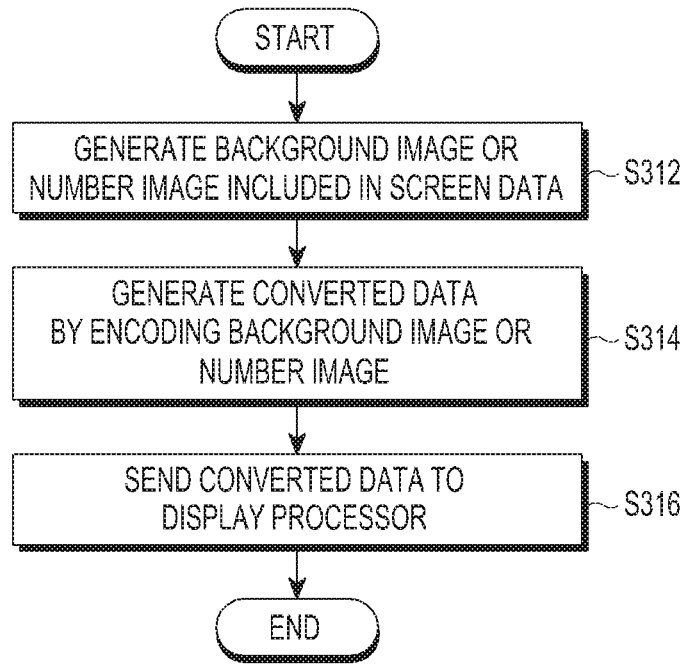

FIG. 3B is a flowchart illustrating a method for generating screen data by an electronic device, such as the electronic device of FIG. 1, according to an embodiment of the present disclosure.

Referring to FIG. 3B, the data generating module 210 of the first processor 110 may generate a background image or number images included in screen data, e.g., clock screens to be displayed on the display 160 for a predetermined time, in operation S312. Once the background image or the number images are generated, the encoding module 220 may generate converted data by encoding the background image or the respective number images, at operation S314. The converted data may have less volume than the volume of the background image or the number images included in the clock screens, which are original images. With the encoding of the background image or number images, the encoding module 220 may reduce the volume of the screen data. Once the converted data is generated, the first processor 120 may forward the converted data to the display processor 180, at operation S316.

In an embodiment, the first clock module 230 may check whether a predetermined period of time, e.g., 10 minutes, has elapsed, and wake up the electronic device 101 at intervals of the predetermined period of time. Once the electronic device 101 is woken up, the first processor 120 may determine the screen data to be displayed on the display 160 for a predetermined time, e.g., 10 minutes. The first processor 120 may generate screen data to be displayed on the display 160 for the predetermined time, or receive the screen data from another device, e.g., the electronic device 104 or the server 106 through the communication interface 170. The first processor 120 may generate converted data by encoding the screen data, and send the converted data to the display processor 180.

Figure 4:
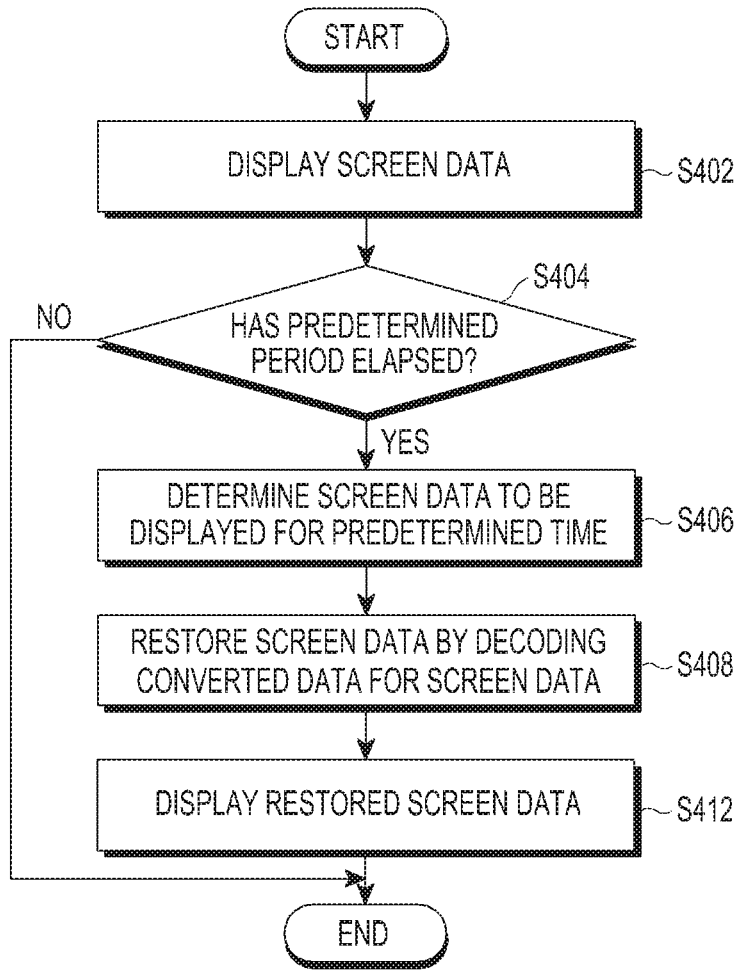
FIG. 4 is a flowchart illustrating a method for displaying screen data by an electronic device, such as the electronic device of FIG. 1, according to an embodiment of the present disclosure.

FIG. 4 is a flowchart illustrating a method for displaying screen data by an electronic device, such as the electronic device of FIG. 1, according to an embodiment of the present disclosure.

Referring to FIG. 4, the display 160 of the electronic device 101 may display screen data, e.g., clock screens each indicating the current time, at operation S402.

In an embodiment, operation S402 may be performed even when the electronic device 101 is in the sleep mode. The display processor 180 may control the display 160 to continue displaying the screen data, e.g., the clock screens, even though the electronic device 101 is inactivated (i.e., in the sleep mode). The order of displaying the screen data, e.g., the clock screens may be set in advance by the display processor 180.

The display processor 180 may determine whether a predetermined period of time, e.g., 10 minutes elapsed, at operation S404. If it is determined at operation S404 that the predetermined period of time has elapsed, the display processor 180 may determine screen data, e.g., clock screens to be displayed on the display 160 for a predetermined time, e.g., 10 minutes, at operation S406. The screen data to be displayed on the display 160 at operation S406 may be clock screens displayed on the display 160 for the predetermined time of 10 minutes, e.g., 10:00~10:09, 10:10~10:19, etc., as forthcoming time after the current time. Once the screen data to be displayed on the display 160 for the predetermined time is determined, the decoding module 250 may restore the screen data by decoding the converted data for the screen data, at operation S408.

The display 160 of the electronic device 101 may then display the restored screen data, at operation S412. The screen data displayed at operation S412 may be e.g., clock screens restored by the decoding module 250 at operation S408.

If it is determined in operation 404 that the predetermined period of time has not elapsed, the electronic device 101 may keep the status quo without performing any particular operation.

The operations described in connection with FIG. 4 may be performed without regard to the operation mode of the electronic device 101. Even when the electronic device 101 is in the sleep mode, the display processor 180 of the electronic device 101 may restore the converted data to the screen data, and control the display 160 to display the screen data according to clocks generated by the second clock module 270.

Figure 5:
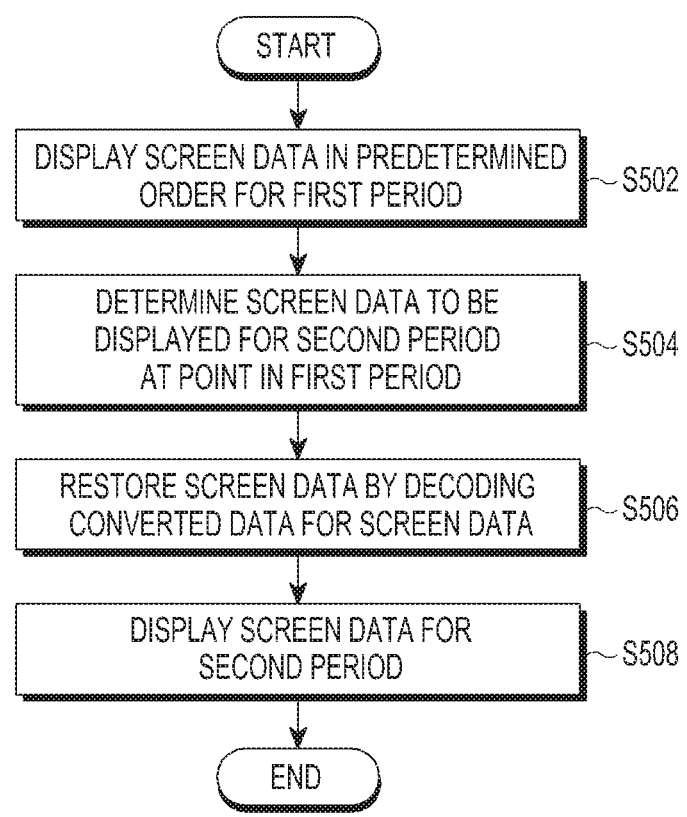
FIG. 5 is a flowchart illustrating a method for displaying screen data by an electronic device, such as the electronic device of FIG. 1, according to another embodiment of the present disclosure.

FIG. 5 is a flowchart illustrating a method for displaying screen data by an electronic device, such as the electronic device of FIG. 1, according to another embodiment of the present disclosure.

Referring to FIG. 5, the display 160 of the electronic device 101 may display screen data, e.g., clock screens in a predetermined order for a first period of time, at operation S502. The order of displaying the clock screens may be determined by the data reconstructing module 260 or determined in advance by the data generating module 210 when the respective clock screens are generated. In an embodiment, the buffer 240 of the display processor 180 may store the screen data or the converted data in the order of displaying the screen data on the display 160.

The display processor 180 may determine screen data to be displayed at a point in the first period of time for a second period of time, at operation S504. The second period of time indicates a period following the first period. For example, if the first period is 10:00~10:09, the second period is 10:10~10:19. The display processor 180 may determine in advance the screen data to be displayed for the second period, before the first period elapsed. For example, given that the first period is 10:00~10:09, the display processor 180 may determine the screen data to be displayed on the display 160 for the second period, 10:10~10:19, at 10:08.

Once the screen data to be displayed on the display 160 for the second period is determined, the display processor 180 may restore the screen data by decoding the converted data for the screen data, at operation S506. The display 160 of the electronic device 101 may then display the screen data restored at operation S506 for the second period, at operation S508.

In an embodiment, operations S504 to S508 may be repeated, and the display 160 may keep on displaying clock screens that represent current time, as the results of repeating the operations S504 to S508.

A method for displaying content by an electronic device in accordance with an embodiment of the present disclosure may include generating converted data by encoding a plurality of screen data according to first clocks, restoring the screen data by decoding the converted data based on second clocks separate from the first clocks, and displaying the restored screen data.

Figure 6:
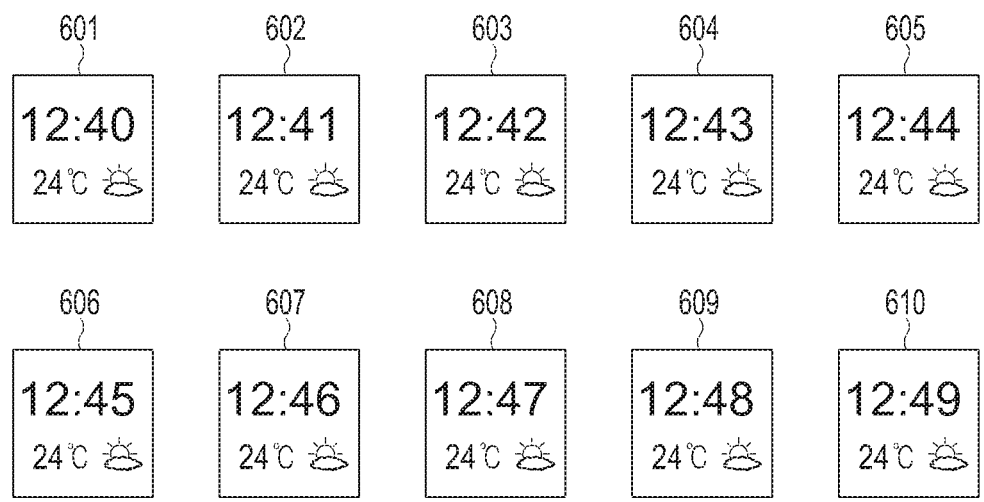
FIG. 6 illustrates screen data that may be displayed by an electronic device, such as the electronic device of FIG. 1, according to various embodiments of the present disclosure.

FIG. 6 illustrates screen data to be displayed by an electronic device, such as the electronic device of FIG. 1, according to various embodiments of the present disclosure.

Referring to FIG. 6, clock screens 601-610 as an example of the screen data may include current time, and may further include current temperature and current weather. The data generating module 210 may generate the clock screens 601-610 to be displayed on the display 160 for the time between 12:40 to 12:49. The display 160 may display a first screen 601 at 12:40, a second screen 602 at 12:41, a third screen 603 at 12:42, a fourth screen 604 at 12:43, a fifth screen 605 at 12:44, a sixth screen 606 at 12:45, a seventh screen 607 at 12:46, an eighth screen 608 at 12:47, a ninth screen 609 at 12:48, and a tenth screen 610 at 12:49.

The first processor 120 may reduce the respective volume of the first to tenth screens 610-610 shown in FIG. 6 by encoding them.

Figure 7A:
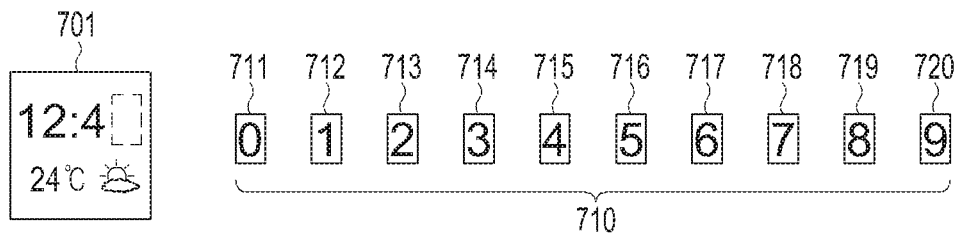
FIGS. 7A and 7B illustrate screen data that may be displayed by an electronic device, such as the electronic device of FIG. 1, according to various embodiments of the present disclosure.
Figure 7B:
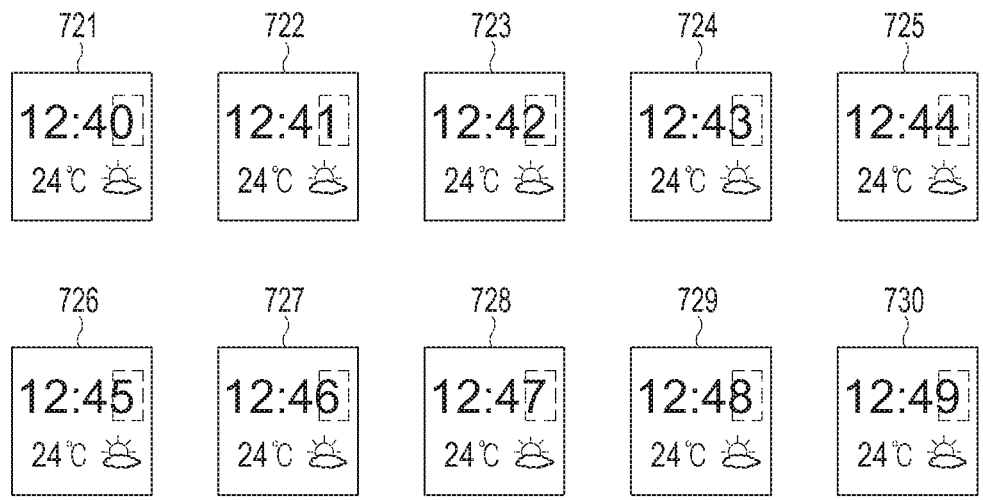

FIGS. 7A and 7B illustrate screen data to be displayed by an electronic device, such as the electronic device of FIG. 1, according to various embodiments of the present disclosure.

Referring to FIGS. 7A and 7B, clock screens are illustrated as an example of the screen data, and may include a background image or number images.

FIG. 7A illustrates a background image 701 and number images 710 (including 711, 712, 713, 714, 715, 716, 717, 718, 719 and 720) contained in one or more clock screens as the screen data, and FIG. 7B illustrates clock screens 721, 722, 723, 724, 725, 726, 727, 728, 729 and 730 resulting from combination of the background image 701 and one of the number images 710.

The data generating module 210 of the first processor 120 may generate the background image 701 and the number images 710 as shown in FIG. 7A. The data reconstructing module 260 of the display processor 180 may reconstruct the clock screens 721 to 730 by combining the background image 701 and the respective number images 710 as shown in FIG. 7B.

Referring to FIG. 7A, the background image 701 may include current time, current temperature, and current weather. The current time included in the background image 701 may not include any number for the unit of a minute.

The number images 710 may each correspond to a number for the unit of a minute left out of the background image 701.

Referring to FIG. 7B, the first screen 721 may be a combination of the background image 701 and the first number image 711, and the second screen 722 may be a combination of the background image 701 and the second number image 712. The third screen 723 may be a combination of the background image 701 and the third number image 713, and the fourth screen 724 may be a combination of the background image 701 and the fourth number image 714. The fifth screen 725 may be a combination of the background image 701 and the fifth number image 715, and the sixth screen 726 may be a combination of the background image 701 and the sixth number image 716. The seventh screen 727 may be a combination of the background image 701 and the seventh number image 717, and the eighth screen 728 may be a combination of the background image 701 and the eighth number image 718. The ninth screen 729 may be a combination of the background image 701 and the ninth number image 719, and the tenth screen 730 may be a combination of the background image 701 and the tenth number image 720. As such, by combining the background image 701 and any of the number images 710, the data reconstructing module 260 may reconstruct one or more clock screens.

Figure 8:
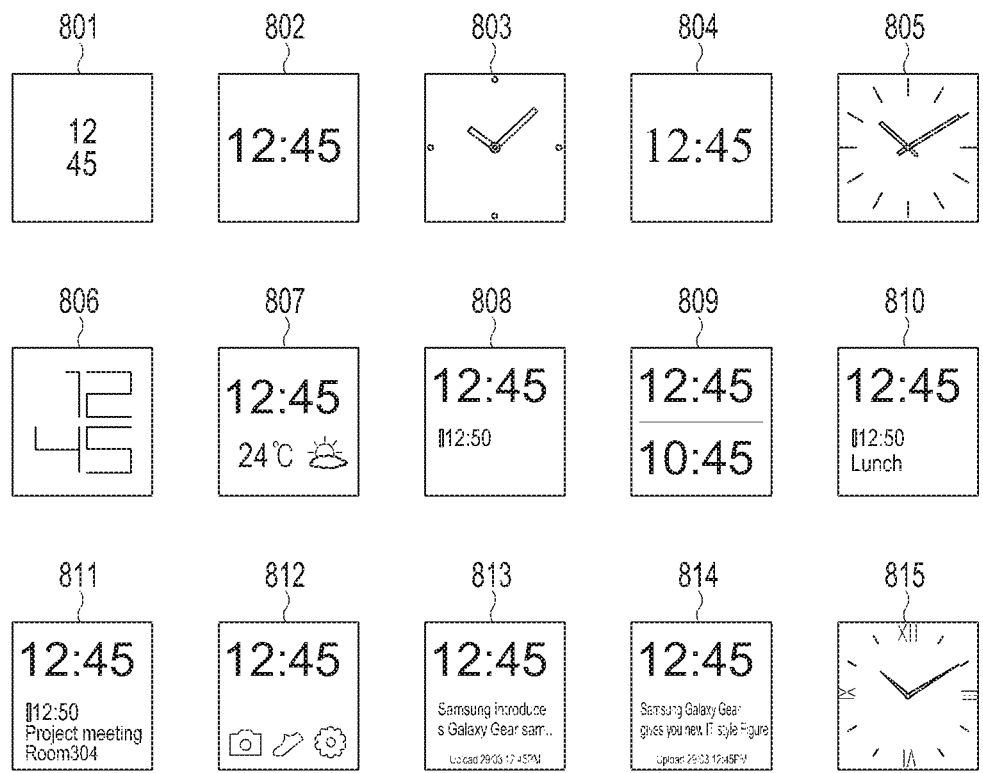
FIG. 8 illustrates screen data that may be displayed by an electronic device, such as the electronic device of FIG. 1, according to various embodiments of the present disclosure.

FIG. 8 illustrates screen data to be displayed by an electronic device, such as the electronic device of FIG. 1, according to various embodiments of the present disclosure.

Referring to FIG. 8, first to fifteenth clock screens 801, 802, 803, 804, 805, 806, 807, 808, 809, 810, 811, 812, 813, 814 and 815 are illustrated as the screen data. The display 160 may display one of the first to fifteenth screens 801 to 815 as the screen data, under control of the first processor 120 or the display processor 180.

The encoding module 220 may generate converted images for the first to fourth images 801 to 804 by encoding the first to fourth images 801 to 804, respectively. The volume of the respective converted images for the first to fourth images 801 to 804 may be 4% of the volume of the respective first to fourth images 801 to 804. In other words, the encoding module 220 may reduce the volume of the respective first to fourth images 801 to 804 down to 4% by encoding the respective first to fourth images 801 to 804.

The encoding module 220 may generate a converted image for the fifth image 805 by encoding the fifth image 805. The volume of the converted image for the fifth image 805 may be 5% of the volume of the fifth image 805. In other words, the encoding module 220 may reduce the volume of the fifth image 805 down to 5% by encoding the fifth image 805.

The encoding module 220 may generate a converted image for the sixth image 806 by encoding the sixth image 806. The volume of the converted image for the sixth image 806 may be 6% of the volume of the sixth image 806. In other words, the encoding module 220 may reduce the volume of the sixth image 806 down to 6% by encoding the sixth image 806.

The encoding module 220 may generate converted images for the seventh and eighth images 807 and 808 by encoding the seventh and eighth images 807 to 808, respectively. The volume of the respective converted images for the seventh and eighth images 807 and 808 may be 7% of the volume of the respective seventh and eighth images 807 and 808. In other words, the encoding module 220 may reduce the volume of the respective seventh and eighth images 807 and 808 down to 7% by encoding the respective seventh and eighth images 807 and 808.

The encoding module 220 may generate converted images for the ninth and tenth images 809 and 810 by encoding the respective ninth and tenth images 809 and 810. The volume of the respective converted images for the ninth and tenth images 809 and 810 may be 8% of the volume of the respective ninth and tenth images 809 and 810. In other words, the encoding module 220 may reduce the volume of the respective ninth and tenth images 809 and 810 down to 8% by encoding the respective ninth and tenth images 809 and 810.

The encoding module 220 may generate a converted image for the eleventh image 811 by encoding the eleventh image 811. The volume of the converted image for the eleventh image 811 may be 9% of the volume of the eleventh image 811. In other words, the encoding module 220 may reduce the volume of the eleventh image 811 down to 9% by encoding the eleventh image 811.

The encoding module 220 may generate a converted image for the twelfth image 812 by encoding the twelfth image 812. The volume of the converted image for the twelfth image 812 may be 10% of the volume of the twelfth image 812. In other words, the encoding module 220 may reduce the volume of the twelfth image 812 down to 10% by encoding the twelfth image 812.

The encoding module 220 may generate converted images for the thirteenth and fourteenth images 813 and 814 by encoding the respective thirteenth and fourteenth images 813 and 814. The volume of the respective converted images for the thirteenth and fourteenth images 813 and 814 may be 12% of the volume of the respective thirteenth and fourteenth images 813 and 814. In other words, the encoding module 220 may reduce the volume of the respective thirteenth and fourteenth images 813 and 814 down to 12% by encoding the respective thirteenth and fourteenth images 813 and 814.

The encoding module 220 may generate a converted image for the fifteenth image 815 by encoding the fifteenth image 815. The volume of the converted image for the fifteenth image 815 may be 16% of the volume of the fifteenth image 815. In other words, the encoding module 220 may reduce the volume of the fifteenth image 815 down to 16% by encoding the fifteenth image 815.

Figure 9:
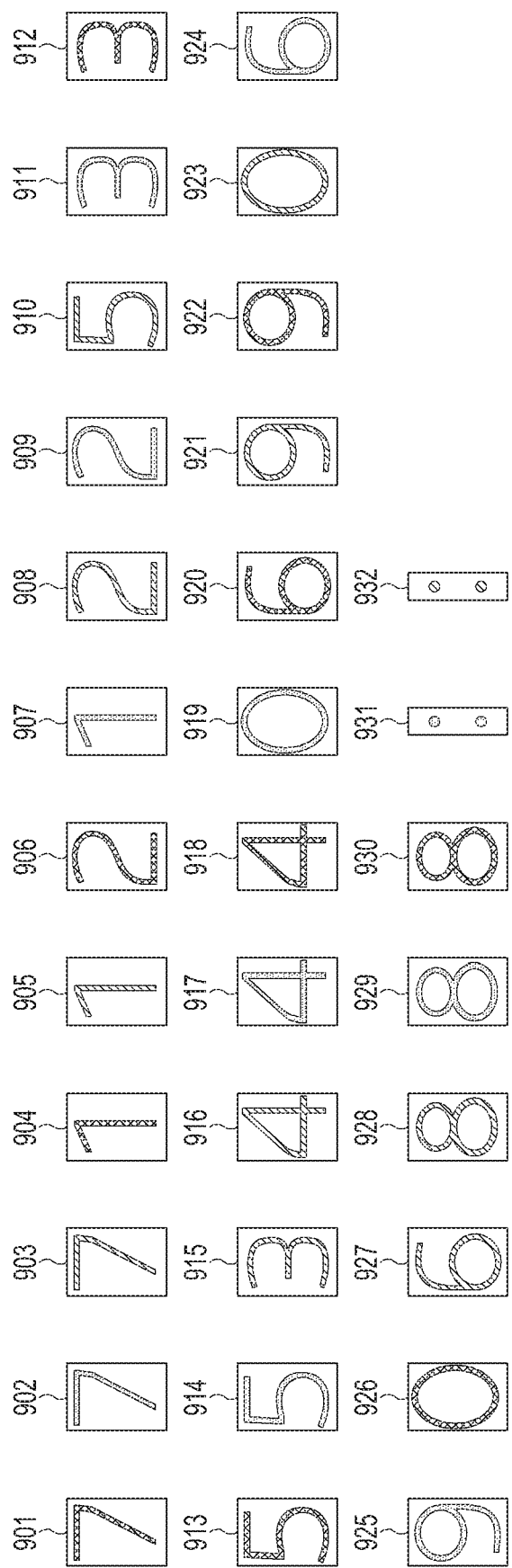
FIG. 9 illustrates number images included in a clock screen among screen data that may be displayed by an electronic device, such as the electronic device of FIG. 1, according to various embodiments of the present disclosure.
Figure 10:
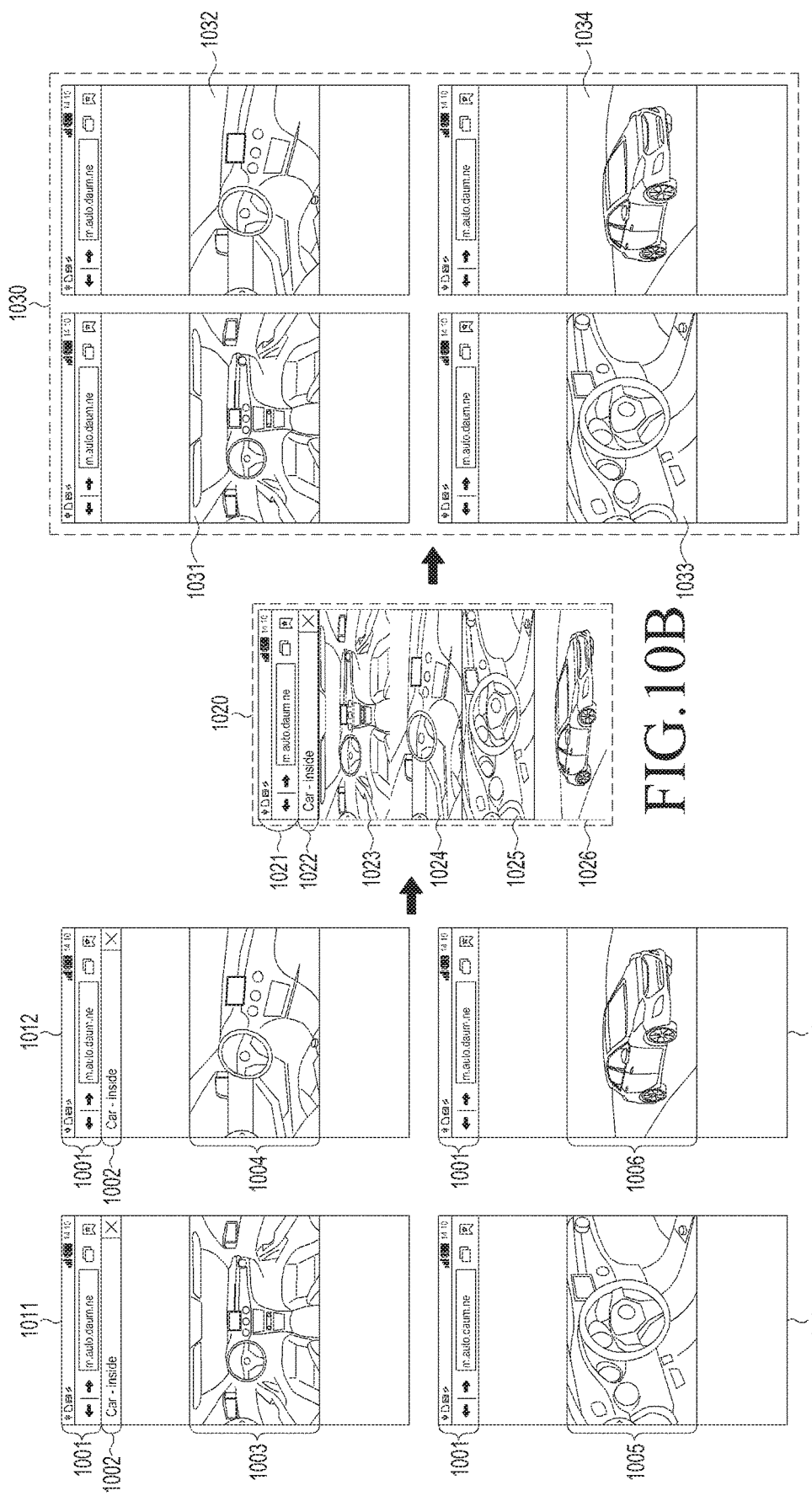
FIGS. 10A, 10B, and 10C illustrate screen data that may be displayed by an electronic device, such as the electronic device of FIG. 1, according to various embodiments of the present disclosure.

FIG. 9 illustrates number images included in clock screens among screen data that may be displayed by an electronic device, such as the electronic device of FIG. 1, according to various embodiments of the present disclosure.

Referring to FIG. 9, first to thirty second images 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, and 932 are illustrated. The encoding module 220 may generate converted images for the first to third images 901, 902, 903 by encoding the first to third images 901, 902, 903, respectively. The volume of the respective converted images for the first to third images 901, 902, 903 may be 13% of the volume of the respective first to third images 901, 902, 903. In other words, the encoding module 220 may reduce the volume of the respective first to third images 901, 902, 903 down to 13% by encoding the respective first to third images 901, 902, 903.

The encoding module 220 may generate converted images for the fourth to ninth images 904 to 909 by encoding the fourth to ninth images 904 to 909, respectively. The volume of the respective converted images for the fourth to ninth images 904 to 909 may be 15% of the volume of the respective fourth to ninth images 904 to 909. In other words, the encoding module 220 may reduce the volume of the respective fourth to ninth images 904 to 909 down to 15% by encoding the respective fourth to ninth images 904 to 909.

The encoding module 220 may generate converted images for the tenth to fifteenth images 910 to 915 by encoding the tenth to fifteenth images 910 to 915, respectively. The volume of the respective converted images for the tenth to fifteenth images 910 to 915 may be 16% of the volume of the respective tenth to fifteenth images 910 to 915. In other words, the encoding module 220 may reduce the volume of the respective tenth to fifteenth images 910 to 915 down to 16% by encoding the respective tenth to fifteenth images 910 to 915.

The encoding module 220 may generate converted images for the sixteenth to eighteenth images 916, 917, 918 by encoding the sixteenth to eighteenth images 916, 917, 918, respectively. The volume of the respective converted images for the sixteenth to eighteenth images 916, 917, 918 may be 19% of the volume of the respective sixteenth to eighteenth images 916, 917, 918. In other words, the encoding module 220 may reduce the volume of the respective sixteenth to eighteenth images 916, 917, 918 down to 19% by encoding the respective sixteenth to eighteenth images 916, 917, 918.

The encoding module 220 may generate converted images for the nineteenth to twenty seventh images 919 to 927 by encoding the nineteenth to twenty seventh images 919 to 927, respectively. The volume of the respective converted images for the nineteenth to twenty seventh images 919 to 927 may be 20% of the volume of the respective nineteenth to twenty seventh images 919 to 927. In other words, the encoding module 220 may reduce the volume of the respective nineteenth to twenty seventh images 919 to 927 down to 20% by encoding the respective nineteenth to twenty seventh images 919 to 927.

The encoding module 220 may generate converted images for the twenty eighth to thirtieth images 928, 929, 930 by encoding the twenty eighth to thirtieth images 928, 929, 930, respectively. The volume of the respective converted images for the twenty eighth to thirtieth images 928, 929, 930 may be 23% of the volume of the respective twenty eighth to thirtieth images 928, 929, 930. In other words, the encoding module 220 may reduce the volume of the respective twenty eighth to thirtieth images 928, 929, 930 down to 23% by encoding the respective twenty eighth to thirtieth images 928, 929, 930.

The encoding module 220 may generate converted images for the thirty first and thirty second images 931 and 932 by encoding the respective thirty first and thirty second images 931 and 932. The volume of the respective converted images for the thirty first and thirty second images 931 and 932 may be 24% of the volume of the respective thirty first and thirty second images 931 and 932. In other words, the encoding module 220 may reduce the volume of the respective thirty first and thirty second images 931 and 932 down to 24% by encoding the respective thirty first and thirty second images 931 and 932.

FIGS. 10A to 10C illustrate screen data to be displayed by an electronic device, such as the electronic device of FIG. 1, according to various embodiments of the present disclosure.

Referring to FIGS. 10A to 10C, FIG. 10A represents screen data generated by the first processor 120, FIG. 10B represents converted data generated by the first processor 120, and FIG. 10C represents screen data displayed on the display 160 under control of the display processor 180.

As an example of the screen data, browser running windows where first to fourth images 1003, 1004, 1005, and 1006 are displayed, respectively, are illustrated. Referring to FIG. 10A, each of the browser running windows are displayed under the indication bar and in a form that includes an address window. Descriptions of the respective first and second images 1003 and 1004 are also shown with the first and second images 1003 and 1004 in the browser running windows. As shown in FIG. 10A, the screen data generated by the first processor 120 may include the browser running window as well as the indication bar displayed with the browser running window.

As an example of the screen data, first screen data 1011 includes first data 1001, second data 1002, and the first image 1003. Second screen data 1012 includes the first data 1001, the second data 1002, and the second image 1004, and third screen data 1013 includes the first data 1001 and the third image 1005. Fourth screen data 1014 includes the first data 1001 and the fourth image 1006.

Since the first data 1001 repeatedly appears in the first to fourth screen data 1011 to 1014 and the second data 1002 repeatedly appears in the first and second screen data 1011 and 1012, the first processor 120 may encode one of the first and second data 1001 and 1002. The first processor 120 may further encode the first to fourth images 1003 to 1006.

FIG. 10B represents results of encoding the first to fourth screen data 1011 to 1014 altogether by the encoding module 220. Referring to FIG. 10B, converted data 1020 may include data 1021 converted from the first data 1001, data 1022 converted from the second data 1002, an image 1023 converted from the first image 1003, an image 1024 converted from the second image 1004, an image 1025 converted from the third image 1005, an image 1026 converted from the fourth image 1006. As such, the first processor 120 may convert the first to fourth screen data 1011 to 1014 to the converted data 1020 that includes six images 1021 to 1026. Since each of the six images 1021 to 1026 was data encoded by the encoding module 220, it may have less volume than that of the first and second data 1001 and 1002 or each of the first to fourth images 1003 to 1006 included in the first to fourth screen data 1011 to 1014.

FIG. 10C represents screen data 1030 restored from the converted data 1020 shown in FIG. 10B. Referring to FIG. 10C, the decoding module 250 may restore the converted data 1020 to the first and second data 1001 and 1002, and first to fourth images 1003 to 1006. The data reconstructing module 260 may reconstruct the first screen data 1031 by combining the first data 1001, the second data 1002, and the first image 1003. The data reconstructing module 260 may reconstruct the second screen data 1032 by combining the first data 1001, the second data 1002, and the second image 1004. The data reconstructing module 260 may reconstruct the third screen data 1033 by combining the first data 1001, the second data 1002, and the third image 1005. The data reconstructing module 260 may reconstruct the fourth screen data 1034 by combining the first data 1001, the second data 1002, and the fourth image 1006.

According to the present disclosure, a method and electronic device is provided that may display content for the user without regard to operation mode of the electronic device.

The electronic device may provide the user with clock functionality by displaying current time even in sleep mode.

Figure 11:
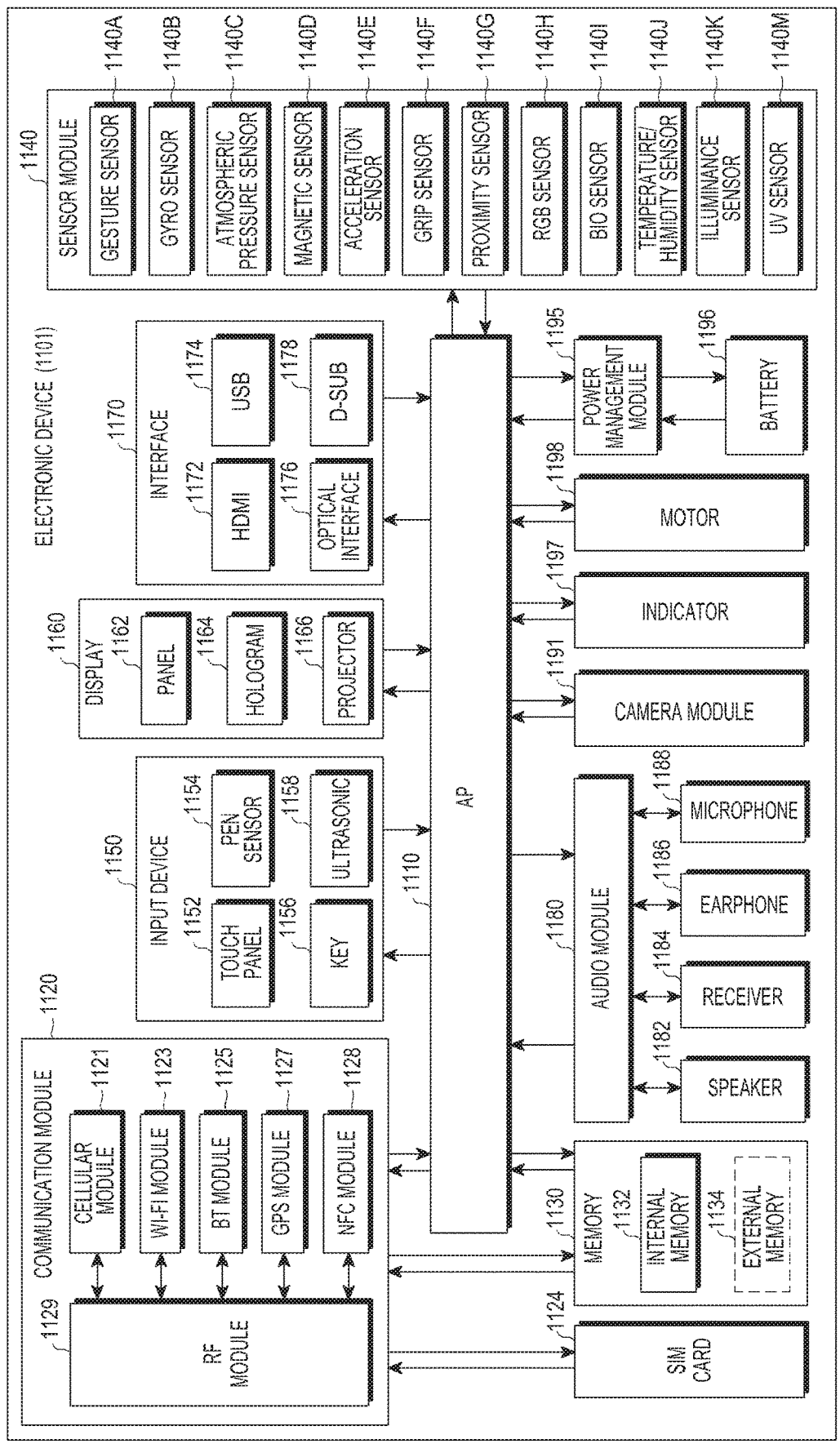
FIG. 11 is a block diagram of an electronic device, such as the electronic device of FIG. 1, according to various embodiments of the present disclosure.

FIG. 11 is a block diagram of an electronic device, such as the electronic device of FIG. 1, according to an embodiment of the present disclosure.

Referring to FIG. 11, the electronic device 1101 may include one or more Application Processors (APs) 1110, a communication module 1120, a Subscriber Identification Module (SIM) card 1124, a memory 1130, a sensor module 1140, an input device 1150, a display 1160, an interface 1170, an audio module 1180, a camera module 1191, a power manager module 1195, a battery 1196, an indicator 1197, and a motor 1198.

The AP 1110 may control hardware and software components connected to the AP 1110 by running an operating system or application programs, and perform data processing and operation. The AP 1110 may be implemented in e.g., a System on Chip (SoC). In accordance with an embodiment, the AP 1110 may further include a Graphic Processing Unit (GPU).

The communication module 1120 (corresponding to the communication interface 170 as shown in FIG. 1) may communicate data with other electronic devices, such as the external electronic device 104 and the server 106 connected via a network. In accordance with an embodiment, the communication module 1120 may include a cellular module 1121, a Wi-Fi module 1123, a BT module 1125, a GPS module 1127, an NFC module 1128, and a Radio Frequency (RF) module 1129.

The cellular module 1121 may provide voice calls, video calls, SMS or Internet services over a communication network, such as LTE, LTE-A, CDMA, WCDMA, UMTS, WiBro, GSM, etc. The cellular module 1121 may also identify and authenticate an electronic device in the communication network in cooperation with the SIM card 1124. In accordance with an embodiment, the cellular module 1121 may perform at least some functions that the AP 1110 may provide. For example, the cellular module 1121 may perform at least a part of multimedia control function.

In an embodiment, the cellular module 1121 may include a Communication Processor (CP). The cellular module 1121 may also be implemented in e.g., an SoC. While the components of FIG. 11, such as the cellular module 1121 (e.g., a CP), the memory 1130 or the power manager module 1195 are illustrated as being separate from the AP 1110, the AP 1110 may incorporate some of the aforementioned components (e.g., the cellular module 1121) in other various embodiments.

In accordance with an embodiment, the AP 1110 or the cellular module 1121 (e.g., a CP) may load a command or data received from at least one of a non-volatile memory or other components connected to the AP 1110 or the cellular module 1121, and process the command or data. In addition, the AP 1110 or the cellular module 1121 may store data received from at least one of the other components or generated by at least one of the other components in a non-volatile memory.

The Wi-Fi module 1123, the BT module 1125, the GPS module 1127, and the NFC module 1128 may each include a processor for processing data sent or received through the corresponding module. While FIG. 11 illustrates each of the cellular module 1121, the Wi-Fi module 1123, the BT module 1125, the GPS module 1127, and the NFC module 1128 as a separate block, some of them (e.g., two or more of them) may be incorporated in a single Integrated Chip (IC) or an IC package in other various embodiments. For example, at least some processors corresponding to the cellular module 1121, the Wi-Fi module 1123, the BT module 1125, the GPS module 1127, and the NFC module 1128, e.g., a CP of the cellular module 1121 and a Wi-Fi processor of the Wi-Fi module 1123 may be implemented in a single SoC.

The RF module 1129 may perform data communication, more specifically, RF signal communication. The RF module 1129 may include e.g., a transceiver, a Power Amplifier Module (PAM), a frequency filter, or a Low Noise Amplifier (LAN) (not shown). The RF module 1129 may further include some parts for wireless communication, i.e., for transmitting or receiving RF signals over the air, such as conductors, wires, etc. While FIG. 11 illustrates that the cellular module 1121, the Wi-Fi module 1123, the BT module 1125, the GPS module 1127, and the NFC module 1128 share the single RF module 1129, at least one of them may perform RF signal communication through a separate RF module.

The SIM card 1124 may include a subscriber identification module, and may be inserted into a slot formed in a particular position in the electronic device. The SIM card 1124 may include unique identification information, such as an Integrated Circuit Card Identifier (ICCID), or subscriber information, such as an International Mobile Subscriber Identity (IMSI).

The memory 1130 (corresponding to the memory 130) may include an internal memory 1132 or an external memory 1134. The internal memory 1132 may include e.g., at least one of a volatile memory, such as Dynamic Random Access Memory (DRAM), Static RAM (SRAM), Synchronous Dynamic RAM (SDRAM), or the like, or a non-volatile memory, such as One Time Programmable Read Only Memory (OTPROM), Programmable ROM (PROM), Erasable and Programmable ROM (EPROM), Electrically Erasable and Programmable ROM (EEPROM), mask ROM, flash ROM, not and (NAND) flash memory, not or (NOR) flash memory, or the like.

In an embodiment, the internal memory 1132 may be a Solid State Drive (SSD). The external memory 1134 may include a flash drive, such as compact flash (CF), secure digital (SD), micro secure digital (Micro-SD), mini secure digital (Mini-SD), extreme digital (xD), memory stick, or the like. The external memory 1134 may be operationally connected to the electronic device 1101 through various interfaces. In an embodiment, the electronic device 1101 may further include a storage device (or a storage medium), such as a hard drive.

The sensor module 1140 may measure a physical quantity or convert information measured or detected by monitoring the electronic device 1101 to an electric signal. The sensor module 1140 may include at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H such as an RGB (Red, Green, Blue) sensor, a bio sensor 1140I, a temperature/humidity sensor 1140J, an illumination sensor 1140K, or an Ultra Violet (UV) sensor 1140M. Additionally or alternatively, the sensor module 1140 may include an E-nose sensor, an electromyography (EMG) sensor, an electroencephalogram (EEG) sensor, an electrocardiogram (ECG) sensor, an infrared (IR) sensor, an iris sensor, a finger print sensor, or the like. The sensor module 1140 may further include a control circuit for controlling at least one or more of the sensors included in the sensor module 1140.

The input device 1150 may include a touch panel 1152, a (digital) pen sensor 1154, a key 1156, or an ultrasonic input device 1158. The touch panel 1152 may recognize touch inputs in at least one of capacitive, resistive, infrared, or ultrasonic methods. The touch panel 1152 may further include a control circuit. With the resistive method, physical contact or proximity detection may be possible. The touch panel 1152 may further include a tactile layer. In this regard, the touch panel 1152 may provide the user with a tactile response.

The (digital) pen sensor 1154 may be implemented in a way identical or similar to e.g., how a touch input of a user is received, or by using a separate sheet for recognition. The key 1156 may include e.g., a physical button, an optical key or a key pad. The ultrasonic input device 1158 may use an input tool that generates an ultrasonic signal and enable the electronic device 1101 to determine data by sensing the ultrasonic signal to a microphone 1188, thereby enabling wireless recognition. In an embodiment, the electronic device 1101 may receive a user input from an external device, such as a computer or a server through the communication module 1120.

The display 1160 (corresponding to the display 160) may include a panel 1162, a hologram device 1164, or a projector 1166. The panel 1162 may be, e.g., a Liquid Crystal Display (LCD), Active Matrix Organic Light Emitting Diodes (AMOLEDs), or the like. The panel 1162 may be implemented to be flexible, transparent, or wearable. The panel 1162 may also be incorporated with the touch panel 1152 in a unit. The hologram device 1164 may make three dimensional (3D) images (holograms) in the air by using light interference. The projector 1166 may display an image by projecting light onto a screen. The screen may be, for example, located inside or outside of the electronic device 1101. In accordance with an embodiment, the display 1160 may further include a control circuit to control the panel 1162, the hologram device 1164, or the projector 1166.

The interface 1170 may include e.g., an HDMI 1172, a USB 1174, an optical interface 1176, or a D-subminiature (D-sub) 1178. The interface 1170 may be included in e.g., the communication interface 170 shown in FIG. 1. Additionally or alternatively, the interface 1170 may include a Mobile High-definition Link (MHL) interface, a secure digital (SD) card/multimedia card (MMC) interface, or IrDA standard interface.

The audio module 1180 may convert a sound to an electric signal or vice versa. At least a part of the audio module 1180 may be included in e.g., the I/O interface 150 as shown in FIG. 1. The audio module 1180 may process sound information input or output through e.g., a speaker 1182, a receiver 1184, an earphone 1186, or the microphone 1188.

The camera module 1191 may be a device for capturing still images and videos, and may include, in an embodiment, one or more image sensors (e.g., front and back sensors), a lens, an Image Signal Processor (ISP), or a flash such as an LED or xenon lamp.

The power manager module 1195 may manage power of the electronic device 1101. Although not shown, e.g., a Power Management Integrated Circuit (PMIC), a charger IC, or a battery or fuel gauge is included in the power manager module 1195.

The PMIC may be mounted on e.g., an IC or an SOC. A charging method may be divided into wired and wireless charging methods. The charger IC may charge a battery and prevent overvoltage or overcurrent from being induced from a charger. In an embodiment, the charger IC may be used in at least one of a cable charging scheme and a wireless charging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 1196, a voltage, a current, or a temperature while the battery 1196 is being charged. The battery 1196 may save or generate electricity, and supply power to the electronic device 1101 with the saved or generated electricity. The battery 1196 may include, e.g., a rechargeable battery or a solar battery.

The indicator 1197 may indicate a particular state of the electronic device 1101 or a part of the electronic device (e.g., the AP 1110), the particular state including e.g., a booting state, a message state, or charging state. The motor 1198 may convert electric signals to mechanical vibration. Although not shown, a processing unit for supporting mobile TV, such as a GPU may be included in the electronic device 1101. The processing unit for supporting mobile TV may process media data conforming to a standard for Digital Multimedia Broadcasting (DMB), Digital Video Broadcasting (DVB), or media flow.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 12:
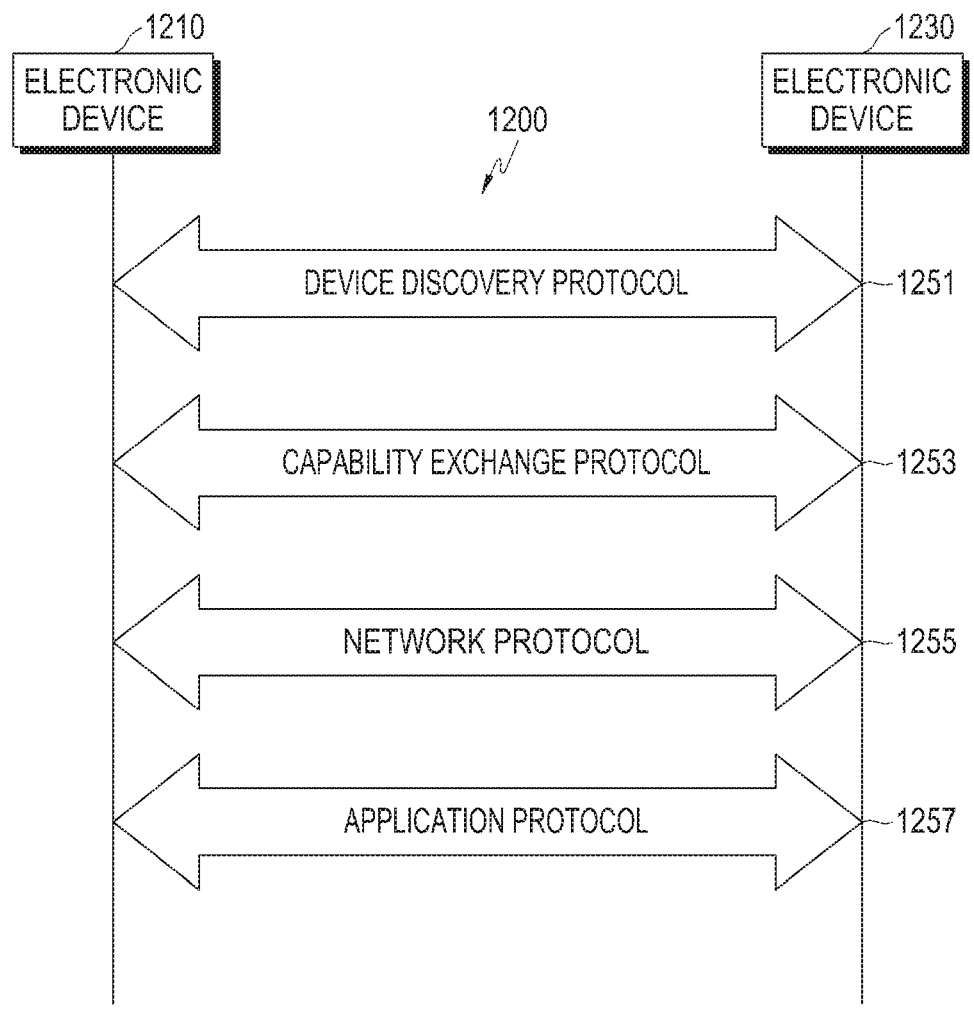
FIG. 12 illustrates communication protocols between multiple electronic devices according to various embodiments of the present disclosure.

FIG. 12 illustrates communication protocols between multiple electronic devices according to various embodiments of the present disclosure.

Referring to FIG. 12, the communication protocol 1200 may include a device discovery protocol 1251, a capability exchange protocol 1253, a network protocol 1255, and an application protocol 1257.

In accordance with an embodiment, the device discovery protocol 1251 may enable each of the electronic devices 1210 and 1230 to discover an external device that may be able to communicate with the electronic device 1210 or 1230 and to connect to the discovered device. For example, with the device discovery protocol 1251, the electronic device 1210 (corresponding to the electronic device 101) may detect the electronic device 1230 (corresponding to the external electronic device 104) that may be able to communicate with the electronic device 1210 by means of a communication scheme, such as Wi-Fi, BT or USB that may be employed by the electronic device 1210. The electronic device 1210 may use the device discovery protocol 1251 to obtain and store identification information for the detected electronic device 1230, in order to make a connection with the electronic device 1230. The electronic device 1210 may, for example, establish a communicative connection with the electronic device 1230 based on the identification information.

In various embodiments, the device discovery protocol 1251 may be a protocol for mutual authentication among multiple electronic devices. For example, the electronic device 1210 may perform an authentication procedure with the electronic device 1230 based on the communication information for access to at least the second electronic device, such as Media Access Control (MAC) address, Universally Unique Identifier (UUID), Subsystem Identification (SSID), Information Provider (IP) address, or the like.

In accordance with an embodiment, the capability exchange protocol 1253 may be defined to exchange information associated with a service capability that may be supported by at least one of the electronic devices 1210 an 1230. For example, with the capability exchange protocol 1253, the electronic devices 1210 and 1230 may exchange information associated with service capabilities being currently provided by them. The exchangeable information may include identification information indicating a particular service among a multiple services that may be supported by the electronic devices 1210 and 1230. For example, the electronic device 1210 may receive identification information for a particular service provided by the electronic device 1230 from the second electronic device through the capability exchange protocol 1233. In this regard, the electronic device 1210 may determine whether to support a particular service based on the received identification information.

In accordance with an embodiment, the network protocol 1255 may be defined to control data flow between electronic devices 1210 and 1230 connected for communication, in order for the electronic devices 1210 and 1230 to provide a service in cooperation with each other. For example, at least one of the electronic devices 1210 and 1230 may perform error control, data quality control or the like, using the network protocol 1255. Additionally or alternatively, the network protocol 1255 may define a transfer format of data exchanged between the electronic devices 1210 and 1230. Furthermore, with the network protocol 1255, at least one of the electronic devices 1210 and 1230 may manage at least a session (e.g., connect the session or terminate the session) for data exchange.

In accordance with an embodiment, the application protocol 1257 may be defined to provide a procedure or information for exchanging data associated with a service to be provided to a foreign electronic device. For example, with the application protocol 1257, the electronic device 1210 (corresponding to the electronic device 101) may provide a service to the second electronic device 1230, e.g., the electronic device 104 or the server 106.

In accordance with an embodiment, the communication protocol 1200 may include a standard communication protocol, a proprietary communication protocol defined by an individual or association (e.g., by a communication equipment manufacturer or a network provider), or a combination thereof.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a programming module. The instructions, when executed by one or more processor (e.g., the first processor 120), may cause the processor to carry out a corresponding function. The computer-readable storage medium may be e.g., the memory 130. At least a part of the programming module may be implemented by e.g., the first processor 120. At least a part of the programming module may include e.g., a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as Compact Disc ROMs (CD-ROMs) and Digital Versatile Discs (DVDs), magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for displaying content, the electronic device comprising:
   a display driver processor; and
   one or more processor configured to:
   identify an occurrence of an event for changing a power mode of the electronic device to a low power mode,
   generate image data by encoding a plurality of screen images for time based on a first clock signal in response to the identification of the event occurrence, the first clock signal being obtained by the one or more processor,
   transmit the image data to the display driver processor,
   wherein the display driver processor is configured to:
   receive and store the image data in a memory of the display driver processor,
   based on a second clock signal, restore in time order at least part of the plurality of screen images by decoding the at least part of the plurality of screen images while the one or more processor is in the low power mode, and
   display restored the at least part of the plurality of screen images in the time order based on current time and the second clock signal while the processor is in the low power mode, and
   wherein the second clock signal is independent from the first clock signal and is generated or received by the display driver processor.

2. The electronic device of claim 1, wherein, before the generating of the image data by encoding the plurality of screen images for time based on the first clock signal, the processor is further configured to generate the plurality of screen images for time based on the first clock signal.

3. The electronic device of claim 1, wherein, before the generating of the image data by encoding the plurality of screen images for time based on the first clock signal, the processor is further configured to receive the plurality of screen images for time from another device based on the first clock signal.

4. The electronic device of claim 2, wherein the processor is further configured to generate the plurality of screen images for time to be displayed for a predetermined time.

5. The electronic device of claim 1, wherein the processor is further configured to perform run-length encoding on the plurality of screen images for time.

6. The electronic device of claim 1, wherein the processor is further configured to:
  sort out first data, which is redundant, from second data, which is not redundant, among data included in the plurality of screen images for time, and
  encode the first data and the second data.

7. The electronic device of claim 6, wherein the display driver processor is further configured to:
  restore the first data and the second data by decoding the received image data, and reconstruct the at least part of the plurality of screen images by combining the first data and the second data.

* * * * *